United States Patent
Yoon et al.

(10) Patent No.: US 11,532,122 B2
(45) Date of Patent: Dec. 20, 2022

(54) METHOD AND APPARATUS FOR PROCESSING HOLOGRAPHIC IMAGE

(71) Applicant: ELECTRONICS AND TELECOMMUNICATIONS RESEARCH INSTITUTE, Daejeon (KR)

(72) Inventors: Min Sung Yoon, Daejeon (KR); Soo Myung Park, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 5 days.

(21) Appl. No.: 17/191,969

(22) Filed: Mar. 4, 2021

(65) Prior Publication Data

US 2021/0279951 A1 Sep. 9, 2021

(30) Foreign Application Priority Data

Mar. 5, 2020 (KR) .................. 10-2020-0027664
Feb. 24, 2021 (KR) .................. 10-2021-0025066

(51) Int. Cl.
*G06T 17/00* (2006.01)
*G06T 7/50* (2017.01)
*G06F 3/01* (2006.01)
*G06F 3/16* (2006.01)
(Continued)

(52) U.S. Cl.
CPC ........... *G06T 17/00* (2013.01); *G03H 1/0841* (2013.01); *G03H 1/16* (2013.01); *G06F 3/017* (2013.01); *G06F 3/167* (2013.01); *G06T 7/50* (2017.01); *G06T 2207/20056* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS 7,950,802 B2   5/2011  Schwerdtner et al.
9,588,490 B2 * 3/2017  Tsang ................. G03H 1/2294
10,191,450 B2  1/2019  Chang
(Continued)

FOREIGN PATENT DOCUMENTS

KR   10-2161950 B1   10/2020

OTHER PUBLICATIONS

Sharma et al. "DenseNetwith pre-activated deconvolution for estimating depth map from single image." Proceeding of the 2017 British Machine Vision Conference, London, UK: BMVA. 2017 (Year: 2017).*

(Continued)

*Primary Examiner* — Saptarshi Mazumder
(74) *Attorney, Agent, or Firm* — LRK Patent Law Firm

(57) ABSTRACT

A method of generating hologram data in a holographic display apparatus, including a hologram processing device generating hologram data and a display terminal reconstructing a hologram image in a three-dimensional (3D) space on the basis of the generated hologram data, includes generating depth map image data from input image data by using a deep learning engine for generating a depth map and calculating a complex value hologram on the basis of the depth map image data and the input image data to generate the hologram data.

17 Claims, 4 Drawing Sheets

(51) Int. Cl.
   *G03H 1/16*      (2006.01)
   *G03H 1/08*      (2006.01)

(56) References Cited

U.S. PATENT DOCUMENTS

| | | |
|---|---|---|
| 10,698,366 B2 | 6/2020 | Lim et al. |
| 11,269,295 B2 * | 3/2022 | Kroll .................... G03H 1/2294 |
| 2014/0211286 A1 * | 7/2014 | Nam .................... G03H 1/0808 |
| | | 359/9 |
| 2020/0273253 A1 * | 8/2020 | Jadallah .................. G06F 1/163 |
| 2021/0174474 A1 * | 6/2021 | Bleyer .................... G01S 17/26 |
| 2021/0232091 A1 * | 7/2021 | Hong ........................ G06T 7/50 |

OTHER PUBLICATIONS

Tomoyoshi Shimobaba et al., "Convolutional neural network-based regression for depth prediction in digital holography", 2018 IEEE 27th International Symposium on Industrial Electronics (ISIE), Feb. 2018.

* cited by examiner

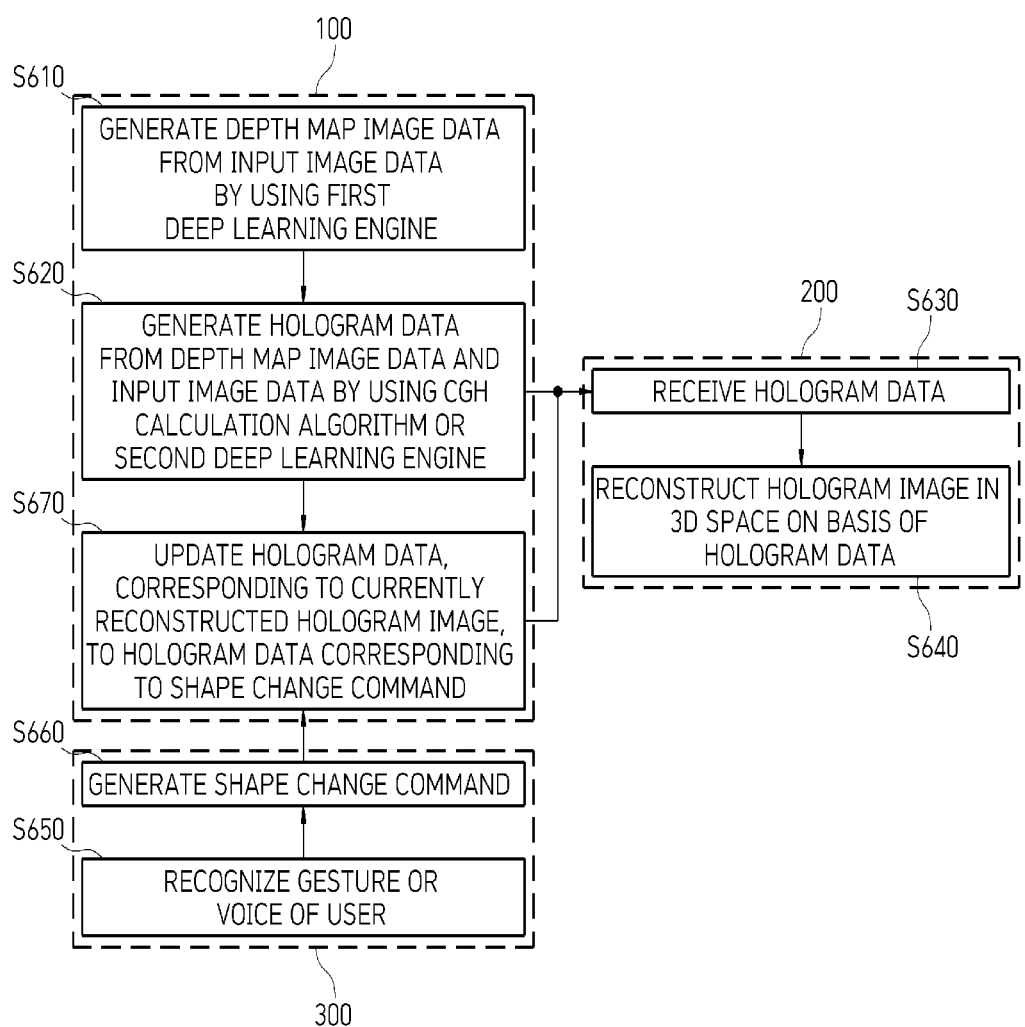

METHOD AND APPARATUS FOR PROCESSING HOLOGRAPHIC IMAGE

CROSS-REFERENCE TO RELATED APPLICATIONS

This application claims priority under 35 U.S.C. § 119 to Korean Patent Application No. 10-2020-0027664, filed on Mar. 5, 2020, and Korean Patent Application No. 10-2021-0025066, filed on Feb. 24, 2021, the disclosure of which is incorporated herein by reference in its entirety.

BACKGROUND

1. Field of the Invention

The present invention relates to technology for generating and processing a high-quality digital hologram.

2. Description of Related Art

Recently, as three-dimensional (3D) display technology advances, an object is expressed based on a complete disparity and depth, and thus, the dizziness and the sense of fatigue of eyes caused by the problem of an accommodation-convergence mismatch are being reduced.

Furthermore, holographic display technology may enable the observation of different images on the basis of the movement of a view and is advancing to 3D display technology which does not need an additional device (for example, glasses) for viewing and enables multi-viewing.

The holographic display technology is technology which intactly reproduces a wave front generated in a given object, and thus, provides the same effect as an effect such as the object being actually in eyes of a person.

However, there are problems and requirements for implementing the holographic display technology.

First, because holographic 360-degree image content generated based on various real objects or computer graphics (CG) is very high in amount of data, it is very difficult to develop technology for processing image content in real time and optically reconstructing the image content.

Second, image content is very high in amount of data, and due to this, is very large in number of arithmetic operations. Due to the burden of the number of arithmetic operations, a method of reconstructing a previously generated image is being developed, and thus, content which allows a viewer to passively observe an image is being created. Therefore, it is required to develop content which enables interaction experience between a user and the content.

SUMMARY

Accordingly, the present invention provides a method and apparatus for processing and displaying a holographic image, which generate hologram data (or holographic content) at a high speed by using a deep learning engine.

The present invention also provides a method and apparatus for processing and displaying a holographic image, which easily generate and display hologram data (or holographic content) based on an interaction with a user.

In one general aspect, a method of generating hologram data in a holographic display apparatus, including a hologram processing device generating hologram data and a display terminal reconstructing a hologram image in a three-dimensional (3D) space on the basis of the generated hologram data, includes: generating depth map image data from input image data by using a deep learning engine for generating a depth map; and calculating a complex value hologram on the basis of the depth map image data and the input image data to generate the hologram data.

In another general aspect, a method of reconstructing the hologram image in a holographic display apparatus, including a hologram processing device generating hologram data and a display terminal reconstructing a hologram image in a three-dimensional (3D) space on the basis of the generated hologram data, includes: generating depth map image data from input image data by using a first deep learning engine; generating the hologram data on the basis of the depth map image data and the input image data by using a second deep learning engine; and reconstructing the hologram image in a 3D space on the basis of the hologram data.

In another general aspect, a holographic display apparatus includes a hologram processing device configured to generate hologram data and a display terminal configured to reconstruct a hologram image in a three-dimensional (3D) space on the basis of the generated hologram data.

In another general aspect, the hologram processing device includes: a depth map generator configured to generate depth map image data from input image data by using a first deep learning engine; a hologram generator configured to generate the hologram data on the basis of the depth map image data and the input image data by using a fast Fourier transform (FFT)-based computer-generated hologram (CGH) calculation algorithm or a second deep learning engine; and a transmitter configured to transmit the hologram data to the display terminal.

In another general aspect, the display terminal includes: a receiver configured to receive the hologram data; a spatial light modulator configured to form a diffraction pattern on the basis of the received hologram data and to modulate light incident on the formed diffraction pattern; and an optical module configured to irradiate coherent light onto the diffraction pattern so that the hologram image is reconstructed in a 3D space on the basis of light modulated by the spatial light modulator.

Other features and aspects will be apparent from the following detailed description, the drawings, and the claims.

BRIEF DESCRIPTION OF THE DRAWINGS

FIG. 6 is a flowchart illustrating a processing method of a holographic display apparatus according to an embodiment of the present invention.

DETAILED DESCRIPTION OF EMBODIMENTS

Figure 1:
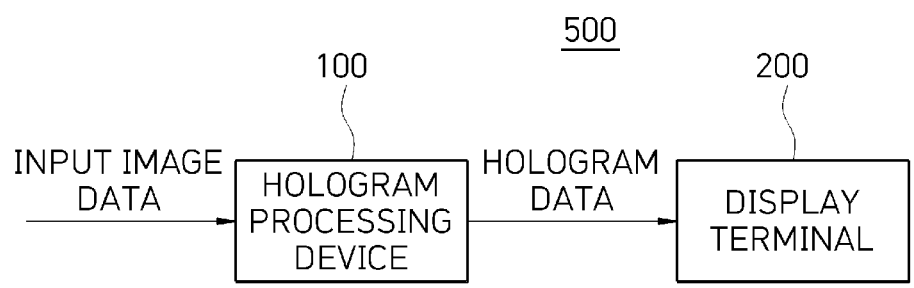
FIG. 1 is a block diagram of a holographic display apparatus according to an embodiment of the present invention.

In embodiments of the present invention disclosed in the detailed description, specific structural or functional descriptions are merely made for the purpose of describing embodiments of the present invention. Embodiments of the present invention may be embodied in various forms, and the present invention should not be construed as being limited to embodiments of the present invention disclosed in the detailed description.

Embodiments of the present invention are provided so that this disclosure will be thorough and complete, and will fully convey the concept of the present invention to one of ordinary skill in the art. Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention.

In the following description, the technical terms are used only for explain a specific exemplary embodiment while not limiting the present invention. The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components.

Hereinafter, embodiments of the present invention will be described with reference to the accompanying drawings. Before describing embodiments of the present invention, in order to help understand the present invention, the theoretical background of hologram calculation and a deep learning method will be briefly described.

Theoretical Background of Hologram Calculation and Deep Learning Method

An arithmetic operation method of generating high-speed hologram data (or holographic content) may use a fast Fourier transform (FFT)-based computer-generated hologram (CGH) equation where RGB image data (RGB) and depth map image data (depth map) are inputs (RGB-depth map). The CGH equation may be as follows.

$$U_{VW}(u, v) = \sum_{i=1}^{m} \frac{e^{\frac{\pi j}{\lambda d_i}(u^2+v^2)}}{j\lambda d_i} \frac{f}{d_i} \int\int U_i(x_i, y_i) e^{\frac{-2\pi j}{\lambda d_i}(ux_i+vy_i)} dx_i dy_i \quad \text{[Equation 1]}$$

$$U_H(x, y) = \frac{j}{\lambda f} \int\int U_{VW}(u, v) e^{-\frac{\pi j}{\lambda f}(u^2+v^2)} e^{\frac{2\pi j}{\lambda f}(xu+yv)} du dv \quad \text{[Equation 2]}$$

Here, (u, v), (xi, yi), Ui, f, λ, and di may respectively represent an observing view-window plane "VW", an $i^{th}$ layer of a 3D scene, an object field of the $i^{th}$ layer, a focal length of a field lens, a wavelength of illumination light, and a viewing distance from a hologram plane "H".

Based on the calculated RGB-depth map-based CGH, an original 3D scene may be reconstructed in a space, and a viewer who performs observation at a view-window position may watch an optically reconstructed 3D scene.

When a 3D space including a 3D scene is divided into a plurality of layers, it may be considered that the hologram plane "H", the observing view-window plane "VW", and each of hierarchical layers is cut in parallel.

A plurality of continuously distributed point clouds may be allocated to a layer closest thereto. Therefore, in order to calculate complex value fields in the hologram plane, discontinuous Fourier transform based on an FFT algorithm may be performed.

Another algorithm for calculating the CGH may be a gerchberg-saxton (GS) algorithm. The GS algorithm may be an iterative Fourier transform algorithm (IFA).

A deep learning model such as a convolution neural network (CNN) may perform learning in a state which maintains space information about an image. The CNN may have a difference with a fully connected neural network.

The CNN may maintain the form of input/output (I/O) data of each layer and may efficiently recognize a feature of an adjacent image while maintaining space information about an image.

Moreover, the CNN may extract and learn a feature of an image by using a plurality of filters. Also, the CNN may use a pooling layer, which collects and reinforces the extracted feature of the image, and a filter as a shared parameter.

Due to such differences, the number of learning parameters for learning the CNN may be far less than a general neural network.

Multi-view color images may be easily obtained by a camera module equipped in a mobile device and may be widely used for learning data for deep learning.

Moreover, the CNN may be easily used to extract a depth map from the multi-view color images.

The CNN may be divided into a part which extracts a feature of an input image and a part which classifies a class of the input image.

The part extracting the feature may be implemented in a structure where a convolutional layer and a pooling layer are stacked.

The convolution layer may be an element which applies input data (or an input image) to a filter to extract a feature of the input data (or the input image).

The pooling layer placed next to the convolution layer may be a selective layer and may use, as a self-node value, a maximum value of values determined in a local node of a previous layer. Additionally, the CNN may further include a fully connected layer for image classification.

The CNN may further include a flatten layer. The flatten layer may be disposed between the part which extracts the feature of the input image and the part which classifies the input image. The flatten layer may be a layer which converts data of an image type into an array type.

The CNN may check input data by using a filter, perform a convolutional operation, and generate a feature map by using a result of the convolutional operation, so as to extract an image feature.

In the convolutional layer, a shape of output data may be changed based on a size of a filter, stride, application of padding, and a maximum pooling size.

FIG. 1 is a block diagram of a holographic display apparatus 500 according to an embodiment of the present invention.

Referring to FIG. 1, the holographic display apparatus 500 according to an embodiment of the present invention may include a hologram processing device 100 and a display terminal 200.

The hologram processing device 100 may be a device which generates hologram data from the input image data and provides (or uploads) the hologram data to the display terminal 200.

The input image data may be image data for providing a selected scene or 3D information about a selected object.

The input image data may be, for example, an RGB color image. The RGB color image may be, for example, a single view color image or a multi-view color image.

The input image data may be obtained by various methods.

For example, the input image data may be obtained by a camera.

As another example, the input image data may be an image which is obtained by computer graphics (CG). Here, the image obtained by the CG may be, for example, an image which is virtually created like an animation image.

The display terminal 200 may be a device which reconstructs (or displays) a hologram image in a 3D space by using hologram data provided (uploaded) from the hologram processing device 100 and a light source having appropriately prepared coherence.

The display terminal 200 may include a spatial light modulator (SLM), and the SLM may generate a diffraction pattern on the basis of the hologram data provided from the hologram processing device 100.

The SLM may modulate coherent light which is incident on the diffraction pattern from the light source. The SLM may modulate the coherent light, and thus, may reconstruct a hologram image, corresponding to the input image data, in a space.

Figure 2:
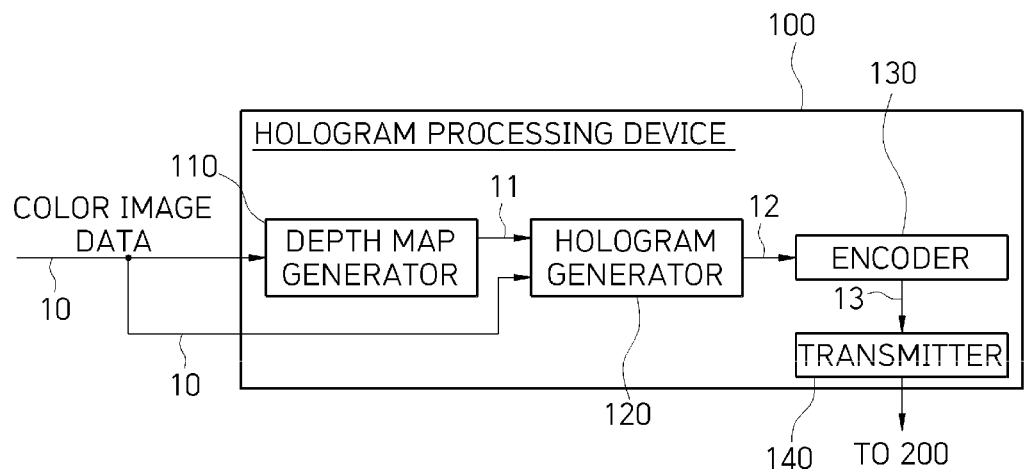
FIG. 2 is a block diagram of a hologram processing device illustrated in FIG. 1.

FIG. 2 is a block diagram of the hologram processing device 100 illustrated in FIG. 1.

Referring to FIG. 2, the hologram processing device 100 according to an embodiment of the present invention may include a depth map generator 110 which generates depth map image data 11 from input image data (hereinafter referred to as color image data) 10, a hologram generator 120 which generates hologram data 120 by using the color image data 10 and the depth map image data 11, an encoder 130 which encodes the hologram data 12, and a transmitter 140 which transmits the encoded hologram data 13 to the display terminal 200.

The hologram processing device 100 may further include general-use elements other than the elements 110, 120, 130, and 140 illustrated in FIG. 2. The general-use elements may include, for example, a processor and a memory.

The depth map generator 110, the hologram generator 120, the encoder 130, and the transmitter 140 may be differentiated from one another by using independent terms on the basis of functions thereof, and the terms are not limited thereto. Therefore, the depth map generator 110, the hologram generator 120, the encoder 130, and the transmitter 140 may be implemented by different hardware resources or the same resource.

When the depth map generator 110, the hologram generator 120, and the encoder 130 are implemented by the same hardware resource, each of the elements 110, 120, and 130 may be a hardware module or a software module, which is executed or operated by a processor which is not illustrated in FIG. 2. In this case, the software module may denote an algorithm which is programmed with various program codes.

Hereinafter, each element included in the hologram processing device 100 will be described in detail.

Depth Map Generator 10

The depth map generator 10 may be implemented as a deep learning engine, in order to generator the depth map image data 11 having high quality.

The deep learning engine for generating the depth map image data 11 having high quality may be a previously learned artificial neural network.

Learning data for training the deep learning engine may include color image data for training and depth map image data for training.

An artificial neural network for generating the depth map image data 11 may include, for example, a convolutional neural network (CNN) including a convolutional layer and a pooling layer as described above.

A CNN-based DenseDepth model may be used for generating (estimating) the depth map image data 11. The DenseDepth model may be a model of a densely connected convolutional networks (DenseNet) type.

The DenseDepth model may include an encoder, which extracts and down-samples a feature of the color image data 10, and a decoder which performs a concatenation operation and up-sampling on features extracted by the encoder with reference to a size of the color image data 10.

A model used training may perform deep learning algorithm design and verification on the basis of a Densenet-161 model supported in Pytorch.

In an embodiment, in order to estimate depth map image data from an input color image having a resolution of 640×360, in a DenseDepth model which is learned to operate in a multi-graphics processing unit (GPU) environment, the inventor has confirmed that an average processing speed of five input color images is 0.6 s, through an experiment.

In the average processing speed, an L1 function has been used by 10% as a loss function and an SSIM function has been used by 90% as the loss function, and an average value of a final loss function value is about 0.0006.

In another embodiment, in order to estimate depth map image data from an input color image having a resolution of 1920×1080, in a DenseDepth model which is learned to operate in a multi-GPU environment, the inventor has confirmed that an average processing speed of 1 epoch (614 pieces) is about four minutes, through an experiment.

In the average processing speed, the L1 function has been used by 10% as the loss function and the SSIM function has been used by 90% as the loss function. In this case, batch size=8, learning rate=0.0001, 10 epoch, and 8 GPU (RTX Titan X 8).

A multi-GPU environment for processing an input color image having a resolution of 1920×1080 may be implemented so that a previously used model operates in the multi-GPU environment by using a data parallel model conversion function which is supported in a Pytorch library.

An image processing operation may be performed on the color image data and the depth map image data generated by the depth map generator 110.

In detail, a process of selecting a desired image region and removing an unselected image region may be performed on the color image data and the depth map image data.

Subsequently, undesired data or noise may be removed from the selected image region.

Subsequently, a process of extracting an image parameter including a direction, a position, and a feature of an object from the selected image region and correcting the extracted image parameter may be performed.

Each of the color image data and the depth map image data processed by the image processing process may be stored as a file having a specific format. For example, the color image data and the depth map image data may be stored in a point cloud format, or may be stored as information having an RGB-depth format.

Although not shown in FIG. 2, an image processor for performing the image processing process may be additionally provided between the depth map generator 110 and the hologram generator 120, and the image processor may be referred to as a preprocessor.

Hologram Generator 120

The hologram generator 120 may calculate a complex value hologram on the basis of the color image data 10 and the depth map image data 11 generated by the depth map generator 110 to generate the hologram data 12. Here, the hologram data 12 may be referred to as holographic content.

In order to generate the hologram data 12, for example, the hologram generator 120 may be implemented as a deep learning engine. The deep learning engine may be a previously learned artificial neural network.

Learning data for training the deep learning engine may include color image data for training, depth map image data for training, and hologram data CGH for training.

The deep learning engine for generating the hologram data 12 may include, for example, a CNN including a convolutional layer and a pooling layer.

When the hologram generator 120 is implemented as the deep learning engine, the hologram generator 120 and the deep learning engine configuring the depth map generator 110 described above may be integrated in an end-to-end structure.

As another example, the hologram generator 120 may generate the hologram data 12 on the basis of a GGH calculation algorithm.

In a case where the hologram data 12 is generated based on the CGH calculation algorithm, the hologram generator 120 may perform a processing process, such as spatial sampling, depth quantization, or space noise minimization, on the depth map image data and the color image data stored in the point cloud format to generate a high-quality/high-speed hologram.

Encoder 130

The encoder 130 may perform various encoding processes, such as amplitude modulation, phase modulation, or complex value modulation, on the hologram data 12 generated by the hologram generator 120 on the basis of an optical modulation scheme of an SLM included in the display terminal 200 and a holographic display characteristic of an optical system. Such an encoding process may be referred to as a post-processing process.

Moreover, the encoder 130 may perform correction on the basis of a characteristic of the display terminal 200. Here, the characteristic of the display terminal 200 may include a source light wavelength and a resolution, which are used in the display terminal 200, and a modulation scheme of data transmitted to the display terminal 200.

The encoder 130 may be integrated into the hologram generator 120, and in this case, the encoder 130 may be removed in FIG. 2.

The hologram data 13 encoded by the encoder 130 may be stored and managed in a folder of a specific memory.

Transmitter 140

The transmitter 140 may transmit the encoded hologram data 13, provided from the encoder 130, to the display terminal 200.

Moreover, the transmitter 140 may transmit one hologram data pair or two or more pieces of hologram data pairs, selected from the encoded hologram data, to the display terminal 200.

In a case where the two or more hologram data pairs are transmitted to the display terminal 200, two pieces of hologram data constituting one pair may be data which is selected to be suitable for each of a left eye and a right eye of a viewer, based on a position of a reconstructed space and the arrangement of an optical device in a case where hologram data is reconstructed in the display terminal 200.

Figure 3:
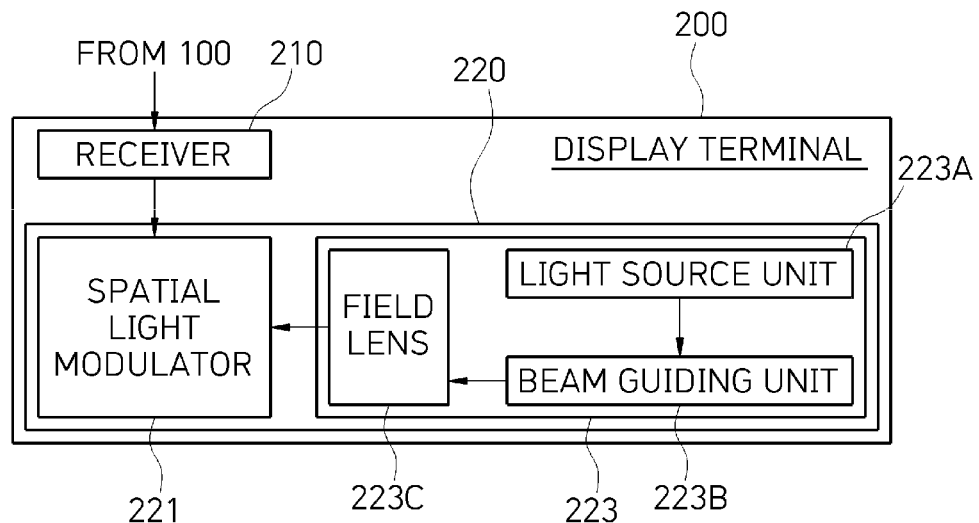
FIG. 3 is a block diagram of a display terminal illustrated in FIG. 1.

FIG. 3 is a block diagram of the display terminal 200 illustrated in FIG. 1.

Referring to FIG. 3, the display terminal 200 according to an embodiment of the present invention may reconstruct or display holographic content corresponding to the selected hologram data received from the hologram processing device 100.

To this end, the display terminal 200 may include a receiver 210 and an optical reconstruction unit 220.

The receiver 210 may receive hologram data from the hologram processing device 100. The receiver 210 may be connected to the transmitter 140 of the hologram processing device 100 by wire, in order to receive the hologram data.

Moreover, the receiver 210 may perform a process of converting or encoding the hologram data so as to be suitable for a display terminal by which the hologram data is to be used.

The optical reconstruction unit 220 may irradiate light on the basis of the hologram data transferred from the data receiver 210 to reconstruct a hologram image in a 3D space. For example, the optical reconstruction unit 220 may modulate an electrical signal, corresponding to the hologram data, into a light signal and may display the modulated light signal to reconstruct the hologram image.

The optical reconstruction unit 220, as illustrated in FIG. 2, may include a spatial light modulator (SLM) 221 and an optical module 223 which uniformly irradiates light on an active region of the SLM 221.

The SLM 223 may include a light source unit 223A which emits coherent light, a beam guiding unit 223B which enlarges light, emitted from the light source unit 223A, to a size of the active region, and a field lens 223C which allows light output from the beam guiding unit 113B to converge to a certain position.

The field lens 223C may have optical transparency, and as illustrated in FIG. 3, the field lens 223C may transfer an optically reconstructed field, corresponding to light from the beam guiding unit 223B, to a position corresponding to eyes of a viewer.

The field lens 223C may be disposed so that an optically reconstructed hologram image is formed in a front space or a back space of the SLM 221.

An arrangement structure between the field lens 223C and the SLM 221 may not be an essential feature of the present invention, and thus, technology known to those skilled in the art may be applied to their descriptions.

However, a function of forming an optically reconstructed hologram image in the front space or the back space of the SLM 221 may be implemented based on an optical refraction or diffraction of the field lens 232C.

The transmitter 140 of the hologram processing device 100 illustrated in FIG. 2, as described above, may select from hologram data (left-eye hologram data) corresponding to a left eye of a viewer and hologram data (right-eye hologram data) corresponding to a right eye of a viewer among pieces of hologram data (or holographic content) generated by the hologram generator 120 and may transmit a hologram data pair, including the selected left-eye hologram data and right-eye hologram data, to the display terminal 200.

Although not shown in FIG. 3, the field lens 223C may include a left-eye field lens and a right-eye field lens, so that the left-eye hologram data and the right-eye hologram data are simultaneously displayed without overlapping.

The left-eye field lens may correspond to the left eye of the viewer, and the right-eye field lens may correspond to the right eye of the viewer. The left-eye field lens and the right-eye field lens may be disposed so that an optically reconstructed hologram image is formed in the front space or the back space of the SLM 221.

Figure 4:
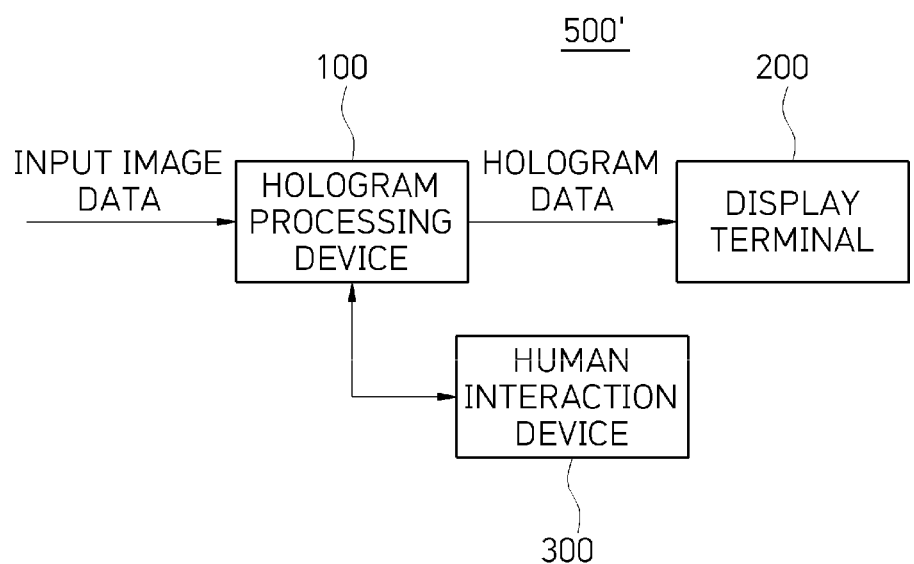
FIG. 4 is a block diagram illustrating a holographic display apparatus for providing an interaction function between a viewer and a display terminal reconstructing a hologram image, according to another embodiment of the present invention.
Figure 5:
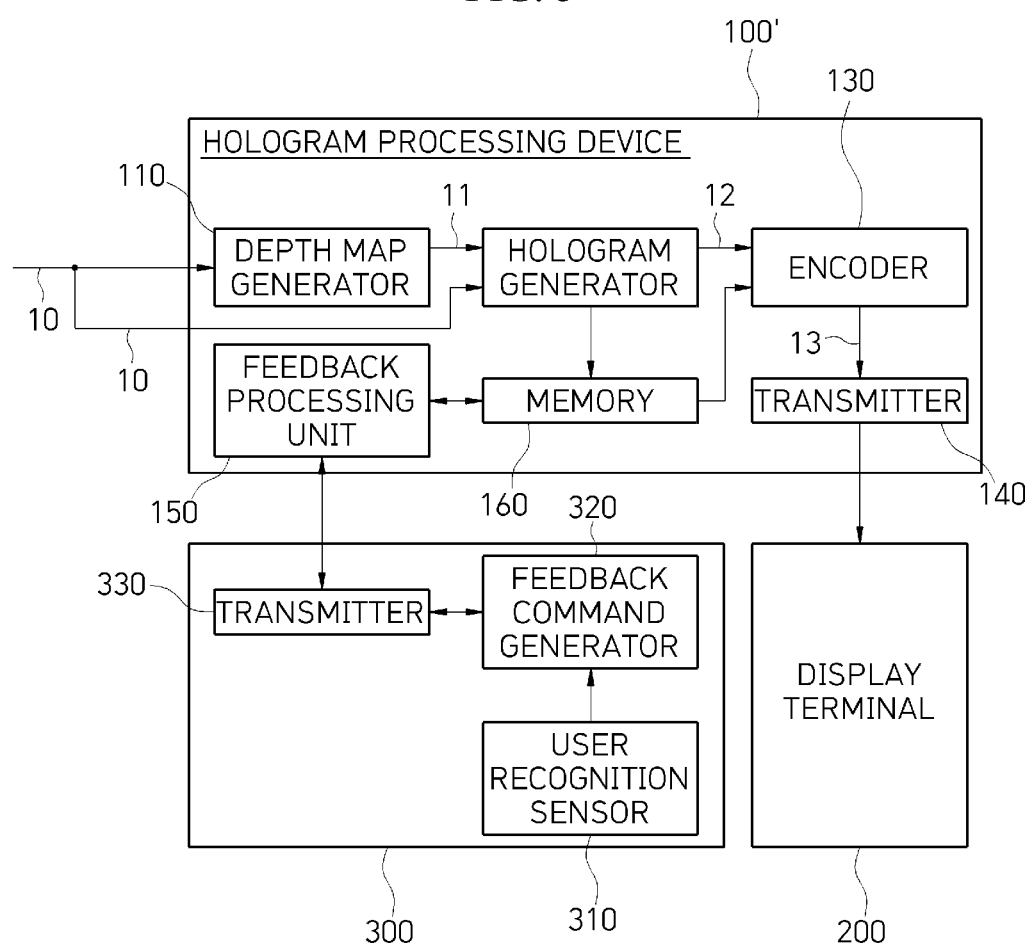
FIG. 5 is a block diagram of a human interaction device illustrated in FIG. 4.

FIG. 4 is a block diagram illustrating a holographic display apparatus 500' for providing an interaction function between a viewer and a display terminal reconstructing a hologram image, according to another embodiment of the present invention. FIG. 5 is a block diagram of an interaction device illustrated in FIG. 4.

Referring to FIGS. 4 and 5, the holographic display apparatus 500' according to another embodiment of the present invention may further include a human interaction device 300 which provides an interaction function between a viewer and the holographic display apparatus 500 illustrated in FIG. 1, and thus, may have a difference with the holographic display apparatus 500 illustrated in FIG. 1.

Moreover, a hologram processing device 100' may further include a feedback processing unit 150, and thus, may have a difference with the hologram processing device 100 illustrated in FIG. 1.

The hologram processing device 100 illustrated in FIG. 5 may further include a memory 160, and thus, may have a difference with the hologram processing device 100 of FIG. 2. However, the hologram processing device 100 of FIG. 2 may actually include a memory. Therefore, the memory 160 included in the hologram processing device 100 in FIG. 5 may not be an element representing a difference with the hologram processing device 100 of FIG. 2.

In FIG. 4, a type where the human interaction device 300 is split from the hologram processing device 100 or the display terminal 200, but may be integrated into the hologram processing device 100 or the display terminal 200.

The human interaction device 300 according to an embodiment of the present invention may provide an interaction function between a viewer and a hologram image (or a holographic stereoscopic image) reconstructed by the display terminal 200 in a 3D space.

To this end, the human interaction device 300 may include a user recognition sensor 310, a feedback command generator 320, and a transmitter 330. Also, the hologram processing device 100' may further include a feedback processing unit 150. Here, when the human interaction device 300 is integrated into the hologram processing device 100, the transmitter 330 may be omitted.

The user recognition sensor 310 may be a sensor which monitors a gesture of a user and may obtain information corresponding to the gesture of the user. The present invention is not limited thereto, and the user recognition sensor 310 may be, for example, a leap-motion sensor.

In a case where the user recognition sensor 310 is implemented as the leap-motion sensor, while the display terminal 200 is reconstructing a hologram image, the user recognition sensor 310 may monitor a gesture corresponding to a hand action of the user to obtain gesture information such as a direction of the hand action, a position of the hand action, and a speed of the hand action.

A shape of the hologram image reconstructed by the display terminal 200 may be changed based on gesture information obtained by the user recognition sensor 310. For example, a rotation direction, a rotation angle, or a rotation speed of a stereoscopic hologram image may be changed based on a gesture of a hand of a user.

In another method of changing a shape of a stereoscopic hologram image, a voice command of a user may be used instead of a gesture of a user. In this case, the user recognition sensor 310 may be implemented as a voice recognizer which recognizes a voice of a user corresponding to a voice command of the user.

In a case where the user recognition sensor 310 is implemented as a voice recognizer, the user recognition sensor 310 may obtain voice recognition information which issues a command to change a shape of a hologram image reconstructed by the display terminal 200.

For example, the user recognition sensor 310 may recognize a voice of the user which issues a command corresponding to a rotation direction, a rotation angle, or a rotation speed of a hologram image desired by the user.

A voice recognition method and a hardware configuration thereof may not be features of the present invention, and thus, technology known to those skilled in the art may be applied to voice recognition.

In order to change a shape of a stereoscopic hologram image on the basis of gesture information or voice recognition information about a user, the feedback command generator 320 may generate a feedback command corresponding to the gesture information or the voice recognition information about the user provided from the user recognition sensor 310.

The feedback command, as described above, may be information for issuing a command to change a shape of a hologram image reconstructed by the display terminal 200.

The feedback command generator 320 may generate a feedback command corresponding to gesture information or voice recognition information about a user provided from the user recognition sensor 310.

A command table may be, for example, a table which records a shape change command (a feedback command) of a hologram image mapped to gesture information or voice recognition information about a user. The table may be, for example, a lookup table.

The transmitter 330 may transmit a shape change command (a feedback command), provided from the feedback command generator 320, to the feedback processing unit 150 of the hologram processing device 100'.

The feedback processing unit 150 may update hologram data (holographic content) transferred from the hologram generator 120 to the transmitter 140 through the encoder 130 on the basis of a shape change command received from the human interaction device 300.

For example, the feedback processing unit 150 may search the memory 160 which stores and manages hologram data generated by the hologram generator 120, and thus, may select hologram data matching the shape change command (the feedback command).

The memory 160 may transfer hologram data, selected by the feedback processing unit 150, to the encoder 130 as hologram data updated based on the gesture information or the voice recognition information about the user.

The encoder 130 may encode the updated hologram data and may transmit the encoded hologram data to the display terminal 200 through the transmitter 140.

Therefore, the display terminal 200 may reconstruct a holographic image corresponding to the updated hologram data on the basis of the gesture information or the voice recognition information about the user.

FIG. 6 is a flowchart illustrating a processing method of a holographic display apparatus according to an embodiment of the present invention.

Referring to FIG. 6, in step S610, a process of generating depth map image data from input image data may be performed by using a first deep learning engine in the hologram processing device 100.

Subsequently, in step S620, a process of generating the hologram data on the basis of the depth map image data and the input image data may be performed by using an FFT-based CGH calculation algorithm or a second deep learning engine in the hologram processing device 100.

Subsequently, in step S630, a process of receiving hologram data from the hologram processing device 100 may be performed by using the display terminal 200.

Subsequently, in step S640, a process of reconstructing a hologram image in a 3D space on the basis of the received hologram data may be performed.

Additionally, in step S650, a process of recognizing a gesture or a voice of a user to obtain gesture information or voice recognition information about the user may be performed by using the human interaction device 300.

Subsequently, in step S660, a process of generating a feedback command for issuing a command to change a shape of the reconstructed hologram image on the basis of the gesture information or the voice recognition information may be additionally performed by using the human interaction device 300.

Subsequently, in step S670, a process of updating the hologram data, corresponding to a currently reconstructed hologram image, to hologram data corresponding to the shape change command may be additionally performed by using the hologram processing device 100.

Subsequently, in step S630, a process of receiving the updated hologram data from the hologram processing device 100 may be additionally performed by using the display terminal 200.

Subsequently, in step S640, a process of reconstructing a hologram image in a 3D space on the basis of the hologram data may be additionally performed by using the display terminal 200.

In an embodiment, before a process of generating the depth map image data, a process of building a database storing, as learning data, input image data for training and depth map image data for training and a process of training a deep learning engine for generating the depth map, based on the learning data may be performed.

In an embodiment, before a process of generating the depth map image data, a process of building a database storing, as learning data, color image data for training, depth map image data for training, and hologram data for training and a process of training a deep learning engine for generating the hologram data, based on the learning data may be performed.

In an embodiment, after a process of generating the depth map image data, a process of encoding the hologram data by using one of amplitude modulation, phase modulation, or complex value modulation on the basis of an optical modulation scheme of a spatial light modulator included in the display terminal may be performed.

In an embodiment, the process of generating the depth map image data may include a process of extracting and down-sampling a feature of the input image data and a process of performing a concatenation operation on the extracted feature and performing up-sampling on the feature with reference to a size of the input image data to generate the depth map image data.

In an embodiment, before the generating of the depth map image data, a process of training the first deep learning engine by using learning data including input image data for training and depth map image data for training, a process of training the second deep learning engine by using learning data including the input image data for training, the depth map image data for training, and hologram data for training, and a process of integrating the trained first deep learning engine and the trained second deep learning engine in an end-to-end structure may be further performed.

In an embodiment, each of the first deep learning engine and the second deep learning engine may be based on a convolutional neural network (CNN).

In an embodiment, the first deep learning engine may be implemented as a DenseDepth model of a densely connected convolutional networks (DenseNet) type.

In an embodiment, the first deep learning engine may be implemented to operate in a multi-GPU environment by using a data parallel model conversion function which is supported in a Pytorch library.

A device according to the embodiments may include a processor, a memory which stores and executes program data, a permanent storage such as a disk drive, a communication port which communicates with an external device, and a user interface device such as a touch panel, a key, and a button.

Methods implemented with a software module or an algorithm may be stored, as computer-readable codes or program instructions executable by the processor, in a computer-readable recording medium. Here, the computer-readable recording medium may include a magnetic storage medium (for example, read-only memory (ROM), random access memory (RAM), floppy disk, hard disk, etc.) and an optical read medium (for example, CD-ROM, digital versatile disk (DVD), etc.). The computer-readable recording medium may be stored and executed as a code which is distributed to a computer system connected to a computer communication network and is readable by using a distributed scheme. The recording medium may be readable by a computer, stored in a memory, and executed by a processor.

The embodiments may be represented by functional block elements and various processing steps. Such functional blocks may be implemented with a number of hardware or/and software elements for executing specific functions. For example, the embodiments may use integrated circuit elements, such as a memory, processing, logic, a lookup table, for executing various functions on the basis of control by one or more microprocessors or various control devices. Similar to that elements are executable by software programming or software elements, the embodiments may be implemented with a programming or scripting language such as C, C++, Java, or assembler, in addition to various algorithms implemented with a data structure, processes, routines, or a combination of other programming elements.

Functional elements may be implemented with an algorithm executed by one or more processors. Also, the embodiments may use conventional technology, for an environment setting, signal processing, and/or data processing.

The descriptions of the embodiments are specific examples and do not limit a technical scope. For convenience of description, conventional electronic elements, control systems, software, and other functional descriptions of the systems may be omitted. Also, connection members or a connection between lines between elements illustrated in the drawings may represent a functional connection and/or physical or circuit connections and may be represented as various functional connections, physical connections, or circuit connections in a real device.

According to an embodiment of the present invention, an arithmetic operation of generating hologram data (or holographic content) may be performed by a deep learning engine, and thus, hologram data (or holographic content) may be created at a high speed.

Furthermore, as a speed of an arithmetic operation increases, personal portable devices, tablet personal computers, and AI display terminals to which an embodiment of the present invention is applied may perform real-time data processing.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of generating hologram data in a holographic display apparatus including a hologram processing device generating hologram data and a display terminal reconstructing a hologram image in a three-dimensional (3D) space on the basis of the generated hologram data, the method comprising:
   generating depth map image data from input image data by using a deep learning engine for generating a depth map; and
   calculating a complex value hologram on the basis of the depth map image data and the input image data to generate the hologram data,
   wherein the generating of the depth map image data comprises:
   extracting and down-sampling a feature of the input image data; and
   performing a concatenation operation on the extracted feature, and performing up-sampling on the feature with reference to a size of the input image data.

2. The method of claim 1, further comprising:
   before the generating of the depth map image data,
   building a database storing, as learning data, input image data for training and depth map image data for training; and
   training a deep learning engine for generating the depth map, based on the learning data.

3. The method of claim 1, wherein the generating of the hologram data comprises calculating the complex value hologram by using a deep learning engine for generating convolutional neural network-based hologram data.

4. The method of claim 3, further comprising:
   before the generating of the depth map image data,
   building a database storing, as learning data, color image data for training, depth map image data for training, and hologram data for training; and
   training a deep learning engine for generating the hologram data, based on the learning data.

5. The method of claim 1, wherein the generating of the hologram data comprises calculating the complex value hologram by using a fast Fourier transform (FFT)-based computer-generated hologram (CGH) equation.

6. The method of claim 1, further comprising, after the generating of the depth map image data, encoding the hologram data by using one of amplitude modulation, phase modulation, and complex value modulation on the basis of an optical modulation scheme of a spatial light modulator included in the display terminal.

7. A method of reconstructing a hologram image in a holographic display apparatus including a hologram processing device generating hologram data and a display terminal reconstructing a hologram image in a three-dimensional (3D) space on the basis of the generated hologram data, the method comprising:
   generating depth map image data from input image data by using a first deep learning engine by extracting and down-sampling a feature of the input image data, and performing a concatenation operation on the extracted feature and performing up-sampling on the feature with reference to a size of the input image data;
   generating the hologram data on the basis of the depth map image data and the input image data by using a second deep learning engine; and
   reconstructing the hologram image in a 3D space on the basis of the hologram data.

8. The method of claim 7, wherein each of the first and second deep learning engines is a convolutional neural network-based artificial neural network.

9. The method of claim 7, further comprising:
   before the generating of the depth map image data,
   training the first deep learning engine by using learning data including input image data for training and depth map image data for training;
   training the second deep learning engine by using learning data including the input image data for training, the depth map image data for training, and hologram data for training; and
   integrating the trained first deep learning engine and the trained second deep learning engine in an end-to-end structure.

10. The method of claim 7, further comprising:
    recognizing a gesture of a user to obtain gesture information about the user;
    generating a shape change command which issues a command to change a shape of the reconstructed hologram image, based on the gesture information;
    selecting hologram data corresponding to the shape change command from among pieces of hologram data which are generated in the generating of the hologram data; and
    updating hologram data, corresponding to a currently reconstructed hologram image, to the selected hologram data,
    wherein the reconstructing of the hologram image comprises reconstructing a hologram image having a shape which differs from a shape of the reconstructed hologram image, based on the updated hologram data.

11. The method of claim 7, further comprising:
    recognizing a voice of a user to obtain voice recognition information about the user;
    generating a shape change command which issues a command to change a shape of the reconstructed hologram image, based on the voice recognition information;
    selecting hologram data corresponding to the shape change command from among pieces of hologram data which are generated in the generating of the hologram data; and
    updating hologram data, corresponding to a currently reconstructed hologram image, to the selected hologram data,
    wherein the reconstructing of the hologram image comprises reconstructing a hologram image having a shape which differs from a shape of the reconstructed hologram image, based on the updated hologram data.

12. A holographic display apparatus comprising:
a processor; and a memory having instructions stored thereon executed by the processor to perform:
a hologram processing device configured to generate hologram data; and
a display terminal configured to reconstruct a hologram image in a three-dimensional (3D) space on the basis of the generated hologram data,
wherein the hologram processing device comprises:
a depth map generator configured to generate depth map image data from input image data by using a first deep learning engine by extracting and down-sampling a feature of the input image data, and performing a concatenation operation on the extracted feature and performing up-sampling on the feature with reference to a size of the input image data;
a hologram generator configured to generate the hologram data on the basis of the depth map image data and the input image data by using a fast Fourier transform (FFT)-based computer-generated hologram (CGH) calculation algorithm or a second deep learning engine; and
a transmitter configured to transmit the hologram data to the display terminal, and
wherein the display terminal comprises:
a receiver configured to receive the hologram data;
a spatial light modulator configured to form a diffraction pattern on the basis of the received hologram data and to modulate light incident on the formed diffraction pattern; and
an optical module configured to irradiate coherent light onto the diffraction pattern so that the hologram image is reconstructed in a 3D space on the basis of light modulated by the spatial light modulator.

13. The holographic display apparatus of claim 12, wherein the first deep learning engine and the second deep learning engine are integrated in an end-to-end structure.

14. The holographic display apparatus of claim 12, wherein each of the first deep learning engine and the second deep learning engine is based on a convolutional neural network (CNN).

15. The holographic display apparatus of claim 12, wherein the first deep learning engine is implemented as a DenseDepth model of a densely connected convolutional networks (DenseNet) type.

16. The holographic display apparatus of claim 12, wherein the first deep learning engine is implemented to operate in a multi-graphics processing unit (GPU) environment by using a data parallel model conversion function which is supported in a Pytorch library.

17. The holographic display apparatus of claim 12, further comprising a human interaction device configured to provide an interaction function between the display terminal and a user,
wherein the human interaction device comprises:
a user recognition sensor configured to recognize a gesture or a voice of the user to obtain gesture information or voice recognition information about the user; and
a feedback command generator configured to a feedback command for issuing a command to change a shape of the reconstructed hologram image, based on the gesture information or the voice recognition information,
the hologram processing device further comprises a feedback processing unit configured to select hologram data corresponding to the feedback command from among pieces of hologram data generated by the hologram generator and to update hologram data, corresponding to a currently reconstructed hologram image, to the selected hologram data, and
the spatial light modulator included in the display terminal forms a diffraction pattern on the basis of the updated hologram data and modulates light incident on the formed diffraction pattern.

\* \* \* \* \*